P. VON SCHMIDT.
Ore Washer.
No. 6,791. Patented Oct. 16, 1849.
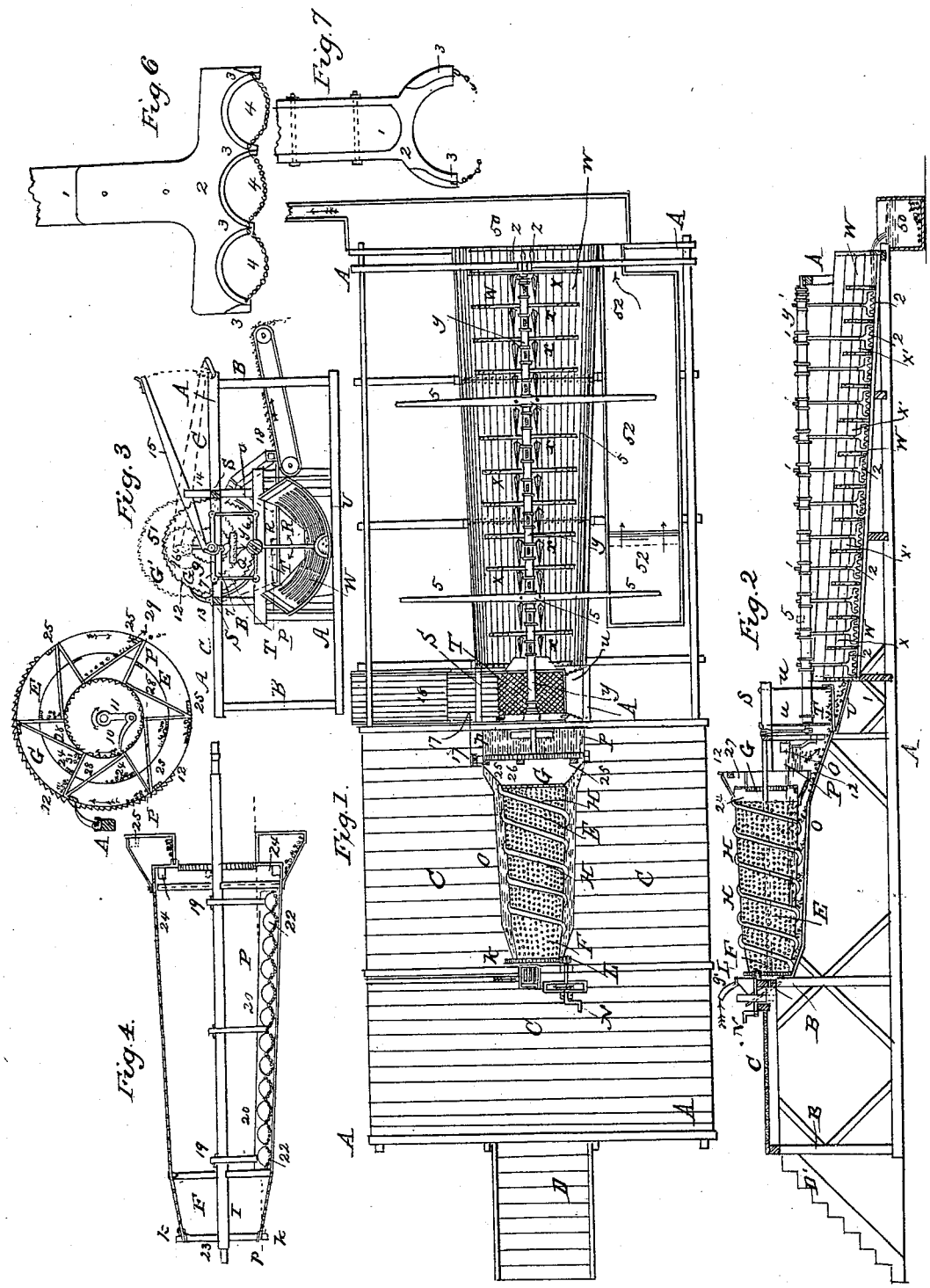

UNITED STATES PATENT OFFICE.

PETER VON SCHMIDT, OF NEW YORK, N. Y.

ORE-WASHER.

Specification of Letters Patent No. 6,791, dated October 16, 1849.

*To all whom it may concern:*

Be it known that I, PETER VON SCHMIDT, of the city, county, and State of New York, have invented new and useful Improvements in Machinery for Washing Gold and Separating It from Foreign Substances, and that the following is a full, clear, and exact description of the principle or character of my invention which distinguishes it from all other things before known and of the manner of making, constructing, and using the same, reference being had to the accompanying drawings, making part of this specification, in which—
Figure 1, is a plan of the machine, Fig. 2, a longitudinal vertical section, Fig. 3, an elevation of the machine as seen from the lower end, Fig. 4, longitudinal section of the rotating screen, Fig. 5, cross section of the same, and Figs. 6 and 7, enlarged views of the rockers and rubbing chains.

The same letters indicate like parts in all the figures.

In my improved machine the earth containing gold and other foreign substances, with a stream of water is fed from a hopper into the small end of a rotating screen, which is perforated with small holes for the passage of the particles of gold, sand, earth, and other foreign substances which are sufficiently small to undergo the washing process. As these substances pass through the meshes of the screen they fall into a semicircular trough and are carried down to the lower or delivery end by spiral blades on the periphery of the screen, and as the screen is conical the delivery end of the trough is lower than the receiving end, which conducts them to the washing trough.
To facilitate the separation of the gold from the foreign substances and to insure their passage through the meshes, there is a series of vibrating rockers with chains suspended to them which drag on the inner surface of the screen. These rockers are attached to arms projecting downward from a central shaft on which the screen is hung, and turns, and the connections are such that the rocking of the shaft imparts an intermittent rotary motion to the screen. The supply of water should be sufficient to conduct the rubbing action of the chains on the substances under treatment under water, for the particles of gold which adhere to slate and clay can only be thoroughly separated by friction under water. The large stones and lumps not sufficiently reduced to pass through the meshes of the screen move toward the large end of the screen and are there arrested by a ring near the end, and then they pass through large holes in the periphery of the screen, and enter another chamber in which there are angular troughs that carry them up by the rotation until they are delivered out through holes in the outer periphery of the chamber and fall into an inclined chute, from which they are taken to be further reduced, and again carried through the screen.

As the fine particles which have passed through the meshes of the screen are delivered from the trough through a spout they fall into a rocking screen which discharges the larger particles which are of such size that the lumps of gold can be separated by an attendant as the mass moves down an inclined chute, but all the fine particles pass through the screen and are delivered into the upper end of an inclined washing trough, the cross section of which is the segment of a circle. This trough is divided into any desired number of compartments by ribs, and in each of these compartments there is a rocker with drag chains which, as the rockers vibrate drag on the bottom of the trough and have the effect of separating the finest particles of gold from the earthy substances to which they are attached. The rockers are all attached to a rock shaft above by which they are all operated simultaneously. The bottom of the trough is formed with longitudinal grooves which lie at right angles to the motion of the rockers and which will therefore constitute receptacles for the particles of gold which pass into them by gravity.

In the accompanying drawings (A) and (B) is a frame purposely adapted to the purpose, and (C) a platform for the attendants who are to supply the machine with the substances to be operated upon. In this platform is formed a semicircular trough (O) in which the rotating screen (E) works, the shaft (I) of the screen is sustained and turns in boxes at each end.

The screen is made of cast iron of a conical form, and a little more abrupt at the receiving end. It is sustained and turns freely on the shaft by arms (18, 18, Fig. 4) near each end, and its periphery is pierced with numerous small holes of about ½ of an inch in diameter. The substances to be separated together with a stream of water are introduced into the small end of the screen through a hopper (I'). There are arms (19) projecting from the shaft, to the outer ends of which is attached a bar (20) scalloped out along the lower edge, as at (21,) to form what I denominate the screen rocker and to the projecting parts of the scallops are attached drag chains (22,) which hang onto the inner periphery of the screen.

As the shaft is vibrated, to move the rockers by the application of the requisite power the chains drag on the surface of the screen, and produce friction in passing among the substances to be separated and as the particles of gold adhere with considerable force to lumps of clay, slate, and other substances, this rubbing action of the chains has the effect to produce a thorough separation. The rocking of the shaft at the same time is made to impart an intermediate rotary motion to the screen by a hand or pawl (10) jointed to an arm (11) on the shaft, which takes into ratchet teeth on the inner periphery of a ring (9) which forms the delivery end of the screen. The particles of matter, such as stones, which cannot pass through the meshes of the screen, when they reach the ring (9), pass out through large holes (24,) in the periphery of the screen, and enter an outer chamber (G) formed around and at the end of the screen, and this chamber is divided by partitions (26,) and (27) into as many compartments as there are large holes (24), in the periphery of the screen, and the angles formed by these partitions are such, that by the rotation of the screen, in the direction of the arrow the stones are carried up and finally delivered through holes (25,) in the outer periphery of the chamber (G,) after having passed over the highest point, and drop into a spout (17) which conducts them onto an inclined chute or endless apron (18,) to be conducted off slowly that the attendant may receive any large lumps of gold which may have passed.

The particles of matter which have passed through the meshes of the screen into the trough below are gradually moved toward the delivery end of the machine by the inclination of the bottom of the trough, the current of water, and mainly by a series of spiral blades (H) on the periphery of the screen, and when they reach the delivery end they pass down an inclined chute (R) and are delivered onto a shaking screen (T,) the shaking motion of which throws off the large particles onto the inclined chute or apron (18), that the attendant may separate by hand any large lumps of gold which may have been carried through, but the finer particles pass through the meshes of the screen and drop onto the upper end of an inclined washing trough (W), the bottom of which in its cross section, is the segment of a circle, and it is divided into a number of compartments by transverse ribs or partitions (X) which, as the current of water passes down with the particles of earth, sand, gold, &c., have the effect to retain the heavier particles, and permit the lighter ones to wash over.

There is a rock shaft (Y) above with a series of rockers (1) projecting down from it, one for each division of the trough. The lower end of these rockers are made double, as shown at (2,) Fig. (7) and the lower edges of these are scalloped as shown at (3) Fig. (6) and then to these are suspended chains (4) which under the working motion drag on the bottom and have a rubbing as well as stirring action on the substances under treatment, which tends to separate the most minute particles of gold from foreign substances that they may fall by gravity into a series of longitudinal grooves (Z) in the bottom of the trough, so that when lodged there the chains will not act on them. The middle part of the division piece (X) are made separate and fitted in by dovetails so that after the machine has been stopped they can be removed to collect the gold which has been collected. The rock shaft (Y) has hand levers (5) attached to it by which it is operated by hand, and at the inner or upper end it has two arms (6, 6,) which are connected by joint links (8, 8,) with two arms (7, 7,) on the rock shaft of the screen, so that by imparting the required rocking motion to the rock shaft of the washing trough, the required rocking motion is given to the rock shaft of the screen, and from this the required intermediate rotary motion to the screen.

The required motions may be given by other means, as the simple mechanical connection of the moving parts, does not constitute any part of what I claim as my invention.

What I claim as my invention and desire to secure by Letters Patent is—

1. The rotating screen, substantially as described, in combination with the rockers and drag chains within it, substantially as described.

2. I also claim the rotating screen with the spiral blades on its outer periphery in combination with the trough in which it works, and through which the substances delivered by the meshes of the screen are made to pass, substantially as described.

3. I also claim the washing trough with its compartments, in combination with the rockers and drag chains, substantially as described.

4. And finally I claim the longitudinal grooves or chambers in the bottom of the trough and at right angles to the motion of the rockers and in combination with such rockers, substantially as described.

PETER VON SCHMIDT.

Witnesses:
M. GRANDIN,
C. W. M. KELLER.